United States Patent [19]

Braha et al.

[11] 4,374,730

[45] Feb. 22, 1983

[54] PROCESS AND APPARATUS FOR THE BIOLOGICAL PURIFICATION OF SEWAGE

[75] Inventors: Alexandru Braha, Frankenthal; Hans Daucher, Ludwigshafen; Klaus Hess, Bad Durkheim; Peter Kroetzsch, Ketsch; Helmut Merkel, Lampertheim; Roland Roedl, Neustadt; Walter Schwaegerl, Hessheim; Richard Stickel, Bad Durkheim, all of Fed. Rep. of Germany

[73] Assignee: BASF Aktiengesellschaft, Ludwigshafen, Fed. Rep. of Germany

[21] Appl. No.: 215,758

[22] Filed: Dec. 12, 1980

[30] Foreign Application Priority Data

Jan. 25, 1980 [DE] Fed. Rep. of Germany ....... 3002604

[51] Int. Cl.$^3$ ................................................ C02F 3/30
[52] U.S. Cl. .................................... 210/608; 210/629; 210/630; 210/903; 210/220; 210/195.4
[58] Field of Search ............... 210/903, 603, 605, 630, 210/629, 220, 608, 195.4

[56] References Cited

U.S. PATENT DOCUMENTS

| 3,900,394 | 8/1975 | Rongved | 210/629 |
| 3,980,556 | 9/1976 | Besik | 210/903 |
| 4,026,802 | 5/1977 | Akae | 210/630 |
| 4,086,160 | 4/1978 | Roesler | 210/608 |
| 4,159,243 | 6/1979 | Okey | 210/629 |
| 4,230,563 | 10/1980 | Roesler | 210/629 |

FOREIGN PATENT DOCUMENTS

| 2233801 | 5/1973 | Fed. Rep. of Germany | 210/903 |
| 2333675 | 1/1974 | Fed. Rep. of Germany | 210/903 |
| 2235089 | 1/1975 | France | 210/903 |

*Primary Examiner*—Benoit Castel
*Attorney, Agent, or Firm*—Keil & Witherspoon

[57] ABSTRACT

A process for the biological purification of effluent which is contaminated with nitrogen in the form of ammonium, nitrite or nitrate ions or in the form of organic compounds, by oxidizing the nitrogen under aerobic conditions and reducing the nitrogen under anaerobic conditions, wherein the sewage to be treated, mixed with activated sludge, is subjected, in an aeration basin, to oxygen-containing gas bubbles introduced from below and is thereby simultaneously enriched with dissolved oxygen, to oxidize carbon compounds and nitrogen compounds, and transported upward, by the buoyancy of the gas bubbles, releases gas at the surface of the liquid and, due to the higher average density of the mixture of lower gas content, in part automatically again flows downward in the aeration basin, to undergo further aeration, while in part it overflows into a denitrification basin which communicates with the aeration basin through an opening at the liquid surface, and an opening at the bottom of the partition, is mixed, in the denitrification basin, with the contents thereof by mechanical means and flows back, through an opening near the bottom, in the partition, to the aeration basin.

The invention further relates to an activated sludge basin, wherein jet aerators are arranged parallel, and horizontally, at the bottom of the basin, a vertical partition divides the basin into an aeration compartment and a denitrification compartment, both compartments possessing jet aerators, and passages in the partition connect the two compartments of the basin in the area of the surface of the liquid, and in the vicinity of the bottom.

8 Claims, 2 Drawing Figures

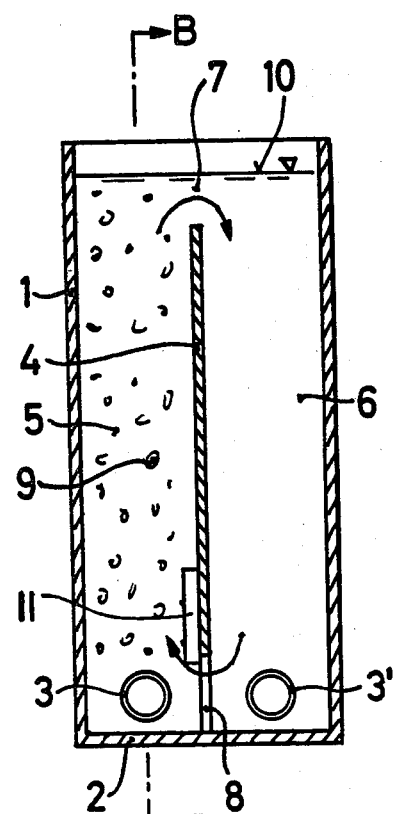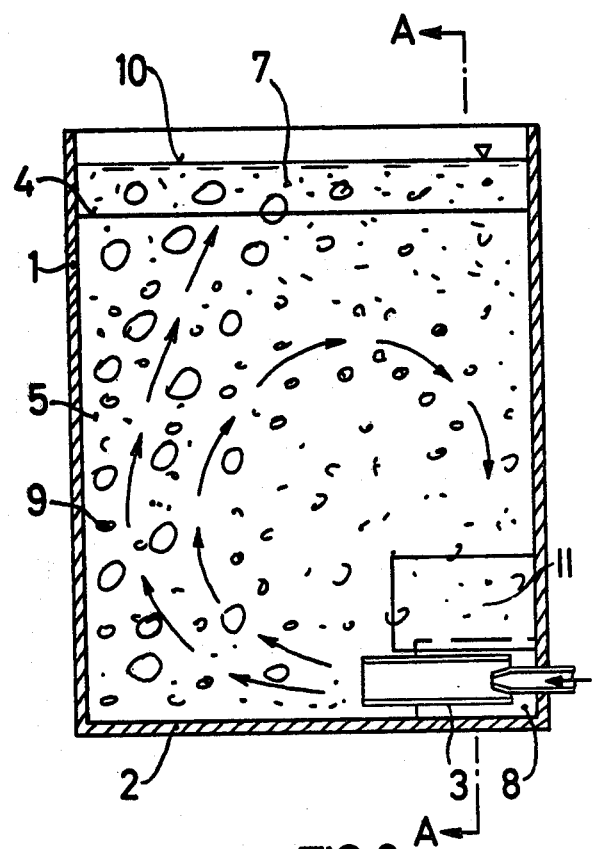
FIG.1
A-A
FIG.2
B-B

PROCESS AND APPARATUS FOR THE BIOLOGICAL PURIFICATION OF SEWAGE

The present invention relates to a process and apparatus for the biological purification of effluent which is contaminated with nitrogen in the form of ammonium, nitrite or nitrate ions or in the form of organic compounds, by oxidizing the nitrogen under aerobic conditions and reducing the nitrogen (denitrification) under anaerobic conditions.

Such processes and apparatus are disclosed, for example, in German Published Application DAS No. 2,233,801 and German Laid-Open Application DOS No. 2,333,675.

In the process of German Published Application DAS No. 2,233,801, ammonium is very substantially nitrified in a second stage, of low biological activity, of a two-stage installation with separate sludge circuits, and at least a part of the sewage which has thus been nitrified is recycled from the settling basin of the second stage to the first stage, so as to undergo denitrification.

Disadvantages of this process are that the denitrification must take place in the oxygen-free sewage of the clarifier of the first stage and the nitrogen formed can cause the sludge to float to the top in the clarifier, and that the sewage discharged into natural bodies of water contains the same concentration of oxidized nitrogen as the part of the sewage which, for denitrification, is recycled to the first stage.

In the process of German Laid-Open Application DOS No. 2,333,675, sewage is purified in an installation with three tanks of which at least two serve alternately as supply tanks and at least one tank serves as a clarifying tank. The two tanks which serve as supply tanks are operated, in alternating periods, aerobically through aeration and anaerobically through circulation without supply of oxygen. The particular tank operated anaerobically at any one time is connected, for the period of such operation, with the tank which serves as the clarifying tank.

It is a disadvantage of this process that expensive instrumentation is required for the alternate operation of three tanks, that during the time required for switching over the tanks so as to change the type of metabolism of the optionally active microbes relatively large amounts of nitrogen, in the form of ammonium or nitrate ions, pass into the effluent, and that if the switch-over entails a fairly long pause the substrate required for denitrification is lacking so that denitrification can no longer take place.

It is an object of the present invention to provide a method of continuously denitrifying the sewage without recycling a part-stream of the biologically purified water, with the oxidized nitrogen dissolved therein, to an upstream biological stage, and without having to switch over the hydraulic flow of water.

We have found that this object is achieved, according to the invention, if the sewage to be treated, mixed with activated sludge, is subjected, in an aeration basin, to oxygen-containing gas bubbles introduced from below and is thereby simultaneously enriched with dissolved oxygen, to oxidize carbon compounds and nitrogen compounds, and transported upward, by the buoyancy of the gas bubbles, releases gas at the surface of the liquid and, due to the higher average density of the mixture of lower gas content, in part automatically again flows downward in the aeration basin, to undergo further aeration, whilst in part it overflows into a denitrification basin which communicates with the aeration basin through an opening at the liquid surface, and an opening at the bottom of the partition, is mixed, in the denitrification basin, with the contents thereof by mechanical means and flows back, through an opening near the bottom, in the partition, to the aeration basin.

Since biologically degradable material must be available to the micro-organisms for effective endogenous respiration of the nitrate oxygen and nitrite oxygen, it is advantageous if sludge from an activated sludge stage upstream of the aeration basin is fed into the denitrification basin to serve as the substrate for the denitrification.

Since the loading factor (F/M ratio) is relatively low, the ability of the nitrifying sludge to adsorb and incorporate materials contained in sewage can advantageously be utilized if the excess sludge formed in the aeration basin is recycled to an upstream activated sludge stage.

Since, on the one hand, the nitrifying sludge grows more rapidly than non-nitrifying microbes only at low F/M ratios, whilst on the other hand adequate substrate for denitrification must be available, it is advantageous if the sewage is pretreated, by a non-nitrifying process, to the point where the residual biochemical oxygen demand, $BOD_5$, in the sewage just suffices for the metabolism of the optionally anaerobic microbes formed.

In order to carry out the process according to the invention, it was necessary to develop a suitable activated sludge basin.

This object was achieved, according to the invention, by an activated sludge basin wherein jet aerators are arranged parallel, and horizontally, at the bottom of the basin, a vertical partition divides the basin into an aeration compartment and a denitrification compartment, both compartments possessing jet aerators; and passages in the partition connect the two compartments of the basin in the area of the surface of the liquid, and in the vicinity of the bottom.

Depending on the degradability of the constituents of the sewage, it is advantageous if the partition divides the activated sludge basin in the volume ratio of from 1:1 to 1:10.

To avoid nonhomogeneous conditions in the respective compartments of the activated sludge basin and ensure rapid distribution of the mixture which flows from one compartment to the other at the bottom of the basin, where turbulence is slight, it is advantageous if the lower passage in the partition is located in the intake region of the jet nozzles of the aeration compartment.

In order to match the residence time of the mixture in the aerobic compartment and the anaerobic compartment of the activated sludge basin effectively to the biological requirements, it is advantageous if the cross-section of the upper and/or lower passages in the partition can be varied during the operation of the activated sludge basin.

The invention is explained in more detail below with reference to the drawings. In these, FIG. 1 shows a section A—A transversely to the partition of the activated sludge basin and FIG. 2 shows a section B—B parallel to this partition.

A partition 4 divides the activated sludge basin 1 into an aeration compartment 5 and a denitrification compartment 6, in the volume ratio of 1:1. For example, the height of the activated sludge basin 1 may be 10 m, its width 3.5 m and its length 7.5 m. The size of the passages 7 and 8 in the partition 4 can be matched to the biological degradation requirements by insertion of beams, as indicated, for passage 8, by movable weir 11 in FIGS. 1 and 2. A jet aerator 3,3' is located in each compartment, 5 and 6, only a few centimeters above the bottom 2 of the basin. In larger installations, a plurality of jet aerators can be provided in each compartment. The jet aerators 3,3' are fed from the outside, through the wall of the activated sludge basin 1, and serve both to supply oxygen and to cause flow. Jet aerator 3 finely disperses oxygen-containing gas in the aeration compartment 5. The mixture, containing gas bubbles 9, rises upward, predominantly along the wall on which the aerator impinges, releases the greater part of the gas, which has become depleted in oxygen, to the environment at the surface 10 and, having become denser as a result of releasing its gas, flows back toward aerator 3 which is at the bottom.

Jet aerator 3' is preferably operated without a supply of gas, so that a sufficient oxygen deficit for denitrification of the oxidized nitrogen should prevail in the denitrification compartment 6. The fluid jet from aerator 3' generates sufficient turbulence to produce suspension in the compartment 6.

As a result of the difference in gas content between the compartments 5 and 6, circulatory flow between the two compartments 5 and 6, through the passages 7 and 8, is generated.

Aerator 3' can be operated with or without oxygen-containing gas, depending on the $BOD_5$ and nitrogen content of the sewage.

The circulation of the activated sludge mixture between compartments 5 and 6—which, as will be noted from FIGS. 1 and 2, takes place in a vertical loop path generally orthogonally disposed with respect to that in the aerobic compartment itself— can be controlled by the ratio of the amounts of gas fed to aerators 3 and 3'. The factor limiting the amount of gas fed to aerator 3' is the denitrification in the compartment 6.

We claim:

1. A process for the biological purification of effluent which is contaminated with nitrogen in the form of ammonium, nitrite or nitrate ions or in the form of organic compounds, by oxidizing the nitrogen under aerobic conditions and reducing the nitrogen under anaerobic conditions, without resort to moving filter beds, said process comprising the steps of:

mixing the sewage to be treated with activated sludge;

introducing oxygen-containing gas bubbles, in an aerobic compartment of an activated sludge basin, from below and thus subjecting the sewage to said bubbles, said basin having a vertical partition which divides the basin into said aeration compartment and a denitrification compartment, simultaneously enriching said sewage with dissolved oxygen, to oxidize carbon compounds and nitrogen compounds, transporting the sewage upward, and causing gas to be released at the surface of the liquid, the sewage being subjected to the gas bubbles in such a way that two substantially orthogonal circulation paths are set up for the sewage over the first of which paths the sewage, upon being transported upward, due to the higher average density of the mixture of lower gas content in part automatically flows downward again in the aeration compartment to undergo further aeration, and over the second of which paths to another part overflows into a denitrification compartment, and denitrification compartment communicating through an opening at the liquid surface and with the aeration compartment through an opening at the bottom of the partition between said compartments;

causing the sewage, in the denitrification compartment, to be physically mixed with the contents thereof, and causing the sewage to flow back, through said opening at the bottom, to the aeration compartment.

2. A process as claimed in claim 1, which also comprises the step of feeding sludge from an activated sludge stage upstream of the aeration compartment into the denitrification compartment to serve as the substrate for the denitrification.

3. A process as claimed in claim 1, which also comprises the step of recycling the excess sludge formed in the aeration compartment to an upstream activated sludge stage.

4. A process as claimed in claim 1, which also comprises the step of pretreating the sewage by a non-nitrifying process, to the point where the residual biochemical oxygen demand, $BOD_5$, in the sewage just suffices for the metabolism of anaerobic microbes.

5. An activated sludge basin for the biological purification of effluent which is contaminated with nitrogen in the form of ammonium, nitrite or nitrate ions or in the form of organic compounds, by oxidizing the nitrogen under aerobic conditions and reducing the nitrogen under anaerobic conditions, said basin having a vertical partition which divides the basin into an aeration compartment and a denitrification compartment, first and second passages being provided in said partition which connect said compartments in the area of the surface of the liquid and in the vicinity of the bottom, respectively, said compartments comprising jet aerators extending horizontally and parallel to each other and to said partition, at the bottom of said compartments, so that the sewage to be treated is subjected, in said aeration compartment, to oxygen-containing gas bubbles introduced from below by the corresponding aerator or aerators, is thereby enriched with dissolved oxygen and transported upward by the buoyancy of the gas bubbles, and the arrangement of the jet aerator or aerators at the bottom of the aeration compartment being such and being so correlated with the arrangement of said second passage that part of the sewage, upon rising upward along the wall of the last-mentioned compartment, on which the aerator impinges, overflows, in a plane substantially normal to said partition, into the denitrification compartment through said first passage while, due to the higher average density of the mixture of lower gas content, another part of said sewage flows, in a plane substantially parallel to said partition, downwardly again in the aeration compartment to undergo further aeration.

6. An activated sludge basin as claimed in claim 5, wherein the partition divides the basin in the volume ratio of from 1:1 to 1:10.

7. An activated sludge basin as claimed in claim 5, wherein the second passage in the partition is located in the intake region of the jet aerators of the aeration compartment.

8. An activated sludge basin as claimed in claim 5, wherein there are provided means for varying the cross-section of the first passage and/or second passage in the partition during the operation of the activated sludge basin.

* * * * *